Jan. 3, 1956  LE ROY C. PASLAY ET AL  2,729,300
WATER BORNE MEANS FOR MAKING SEISMIC SURVEYS
Filed Nov. 29, 1949  5 Sheets-Sheet 2

Inventors
L. C. Paslay
G. M. Pavey, Jr.
F. P. Wipff
By V. F. Presson
Attorney

Jan. 3, 1956  LE ROY C. PASLAY ET AL  2,729,300
WATER BORNE MEANS FOR MAKING SEISMIC SURVEYS
Filed Nov. 29, 1949  5 Sheets-Sheet 4

Inventors
L. C. Paslay
G. M. Pavey, Jr.
F. P. Wipff
By N. P. Presson
Attorney

United States Patent Office 2,729,300
Patented Jan. 3, 1956

2,729,300

WATER BORNE MEANS FOR MAKING SEISMIC SURVEYS

Le Roy C. Paslay, George M. Pavey, Jr., and Frank P. Wipff, Dallas, Tex., assignors to Marine Instrument Company, Dallas, Tex.

Application November 29, 1949, Serial No. 129,896

9 Claims. (Cl. 181—.5)

This invention relates to a method and waterborne means for making a seismic survey of underwater deposits of oil and more particularly to a system for surveying subaqueous geological formations and exploring oil-retaining subsurface terrestrial structures by seismic signals received by a plurality of detecting devices disposed within an elongated flexible streamer towed, at a high rate of speed, near the bed of a body of water and at a reduced rate of speed as the explosive shot is fired in which means are provided for preventing acoustic pickup of extraneous signals by the detecting devices caused by vibration of the lead-in from the streamer to the vessel and compressional effects of the streamer longitudinal as the towing force thereon is reduced.

In systems of this character heretofore devised, it has been the general practice to employ seismometers arranged on the bed of a body of water or when towed from a moving vessel to be allowed to sink and come to rest on the bed of the water before the explosive shot is fired. Such systems are necessarily slow in operation for the reason that, in practice, it has been found necessary to bring the towing vessel to a full and complete stop and wait until the seismometers have become quiet after settling to the bottom before the explosive shot is fired. In certain other systems such, for example, as the system disclosed and claimed in Patent 2,465,696 to L. C. Paslay for Method and Means for Surveying Geological Formations, issued March 29, 1949, the seismic detectors comprise piezoelectric microphonic devices disposed within a neutrally buoyant streamer and towed through the water by a moving vessel. In the systems in which seismometers are employed to detect the seismic vibrations received from the bed of the body of water, it has been found necessary to maintain the seismometers in a vertical position and in good contact with the bed for satisfactory results. In cases where mud or silt predominates sufficiently to form a soft bed or the seismometer is tilted considerably from the vertical, the seismic signals received are often weak and ineffective to actuate the seismometer sufficiently for satisfactory response to such signals.

The system of the present invention possesses all of the advantages of the prior systems and none of the foregoing disadvantages. In accordance with the arrangement of the present invention, the detection streamer is so constructed and arranged as to be slightly positively buoyant when immersed in the water and is provided with a plurality of weights suspended therefrom at intervals and adapted to cause the streamer assembly to be neutrally buoyant when towed through the water at a high rate of speed by a moving vessel whereby the streamer slowly sinks through the water at the points of connection with the weights as the forward end of the streamer is momentarily brought to rest during the towing operation and the sections of the streamer intermediate the weights slowly rise within the water. An arrangement is thus provided in which only the forward end of the streamer is momentarily brought to rest, the remainder of the streamer continuing forward movement as the shot is fired and the entire length of streamer is maintained in tension during the reception of the seismic signals whereby fortuitous noises of spurious character caused by a release of the towing strain within the streamer and extraneous noise signals from the lead-in connecting the streamer and the vessel are prevented from being picked up by the detecting devices. The invention also includes the firing of explosive shots near the surface of the water at a point substantially midway the length of the cable at intervals corresponding to one-half the length of the detector streamer whereby a continuous seismic survey is obtained while the vessel is moving continuously at a relatively high rate of speed.

One of the objects of the present invention is to provide a new and improved seismic surveying system which is waterborne and in which a continuous seismic survey is obtained while the towing vessel is moving at a high rate of speed.

Another of the objects is to provide a new and improved waterborne seismic recording system in which the detecting elements are towed through the water at a high rate of speed and in which means are provided for preventing extraneous signals caused by the towing means from being picked up by the detecting elements while the seismic signals are being received.

Still another object is the step-by-step operation of the firing means while the vessel is traveling rapidly through the water whereby a continuous seismic survey of subaqueous terrestrial formations is made.

A still further object is to provide a new and improved detecting streamer for a waterborne seismic surveying system in which means are provided for rendering the streamer neutrally buoyant while being towed through the water and alternately negatively and positively buoyant at intervals throughout the length thereof when the forward end of the streamer is momentarily anchored while seismic signals are received.

Still another object resides in the method of towing the detecting streamer through the water near the bottom at a high rate of speed, momentarily arresting movement of the forward end of the streamer, and maintaining the streamer in continuous tension throughout the length thereof while the forward end is arrested and seismic signals are received.

A still further object is the provision of a new and improved waterborne seismic surveying system which is fast and reliable in operation, possesses a high degree of sensitivity in receiving seismic signals to the exclusion of other extraneous signals which may be present in the water, which is economical to manufacture, and in which continuous step-by-step operation of the seismic surveying equipment may be achieved.

Still other objects, improvements and advantages will be apparent from the following description, taken in connection with the accompanying drawings of which.

Figure 1:
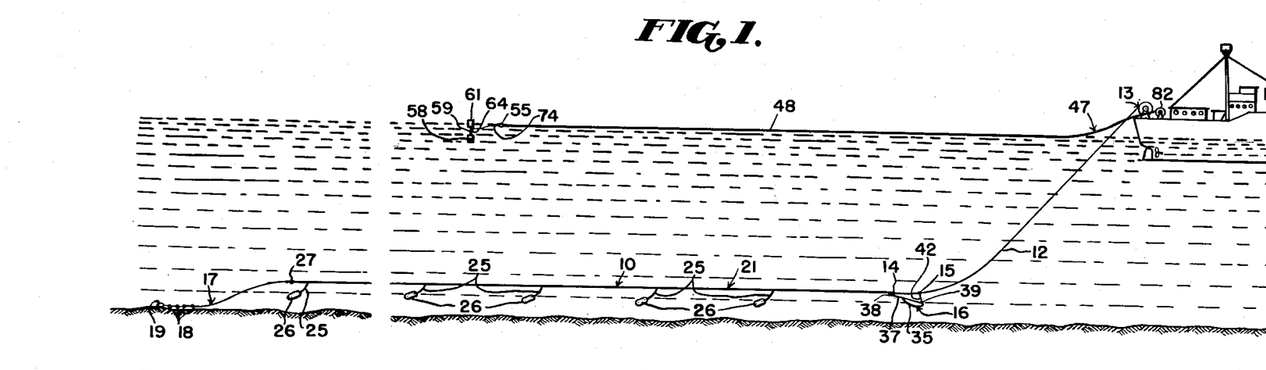
Fig. 1 is a diagrammatic view of the system of the present invention in accordance with a preferred embodiment thereof in which the detection streamer is being towed by the vessel and the firing line is being payed out.

Referring now to the drawings on which like numerals of reference are employed to designate like parts throughout the several views and, more particularly, to Fig. 1 thereof, there is shown thereon in diagrammatic form a preferred embodiment of the system of the present invention, the system comprising a detector streamer indicated generally by the reference numeral 10 towed by a vessel 11 near the bed of the body of water. The streamer 10 is provided with a lead-in or tow cable 12 adapted to be payed out by a reel 13 for establishing a towing connection between the streamer and the vessel. Secured to the lead-in 12 at the head end of the detection streamer at points 14 and 15 is a depressor 16 for maintaining the tow cable at a depth of submersion near the bed of the body of water and for momentarily arresting forward movement of the head end of the detection streamer as will be more clearly apparent as the description proceeds. The tail end of the detection streamer is connected to a flexible line or rope 17 having a plurality of weights 18 composed of material suitable for the purpose such, for example, as lead connected at intervals thereto and an additional weight 19 at the trailing end thereof. The weights 18 and 19 are employed for imparting sufficient negative buoyancy to the line 17 to maintain the line 17 in continuous contact with the bed of the water while seismic prospecting operations are in progress.

The term "positively buoyant" as employed herein may be defined as a condition in which the weight of the fluid displaced by an object completely immersed therein is greater than the weight of the object. In like manner "negatively buoyant" is defined as a condition in which the weight of the fluid displaced by an object completely immersed therein is less than the weight of the object. The term "neutrally buoyant" is defined herein as a condition in which the weight of the fluid displaced by an object completely immersed therein is equal to the weight of the object.

Figure 11:
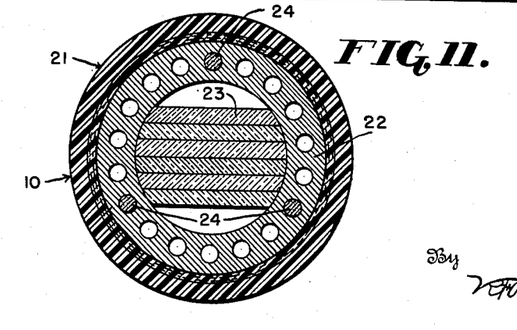
Fig. 11 is an enlarged sectional view of the detection streamer showing the strain cables and one of the seismic detecting devices disposed therein.

The detection streamer 10 may be of any type suitable for the purpose such, for example, as the detection streamer disclosed and claimed in Patent 2,465,696 for Method and Means for Surveying Geological Formations, issued March 29, 1949, to L. C. Palsay, in which are arranged at intervals throughout the length thereof a plurality of piezoelectric microphonic devices for detecting variations in pressure of the surrounding water caused by the seismic signals received from a subaqueous reflecting surface. As more fully disclosed in the Paslay patent aforesaid, the detection streamer comprises a plurality of microphonic sections composed of lengths of flexible tubing 21 of rubber or any of the synthetic varities thereof such, for example, as extruded "Vinyl" hose within which is disposed a plurality of annular floats interspersed between a plurality of microphonic casings 22, a microphone 23 being arranged within each of the microphone casings and responsive to variations in pressure of oil or similar fluid with which the detection streamer is filled. A plurality of strain cables 24 extend throughout the length of the detection streamer, each of the strain cables being cemented or otherwise secured to the floats and microphone casings aforesaid. An arrangement is thus provided in which the towing strain is applied not only to the head end of the detection streamer but also by way of the strain cables to a plurality of points along the streamer by reason of the snug fitting of the floats and microphone casings to the flexible tubing 21. Whereas Patent 2,465,696 to L. C. Paslay discloses a detection streamer having neutral buoyancy when immersed in water, the detection streamer of the present invention is slightly positively buoyant when the weights 26 are not connected thereto. This may be achieved in any convenient way as by merely increasing the number of floats within the streamer.

Figure 2:
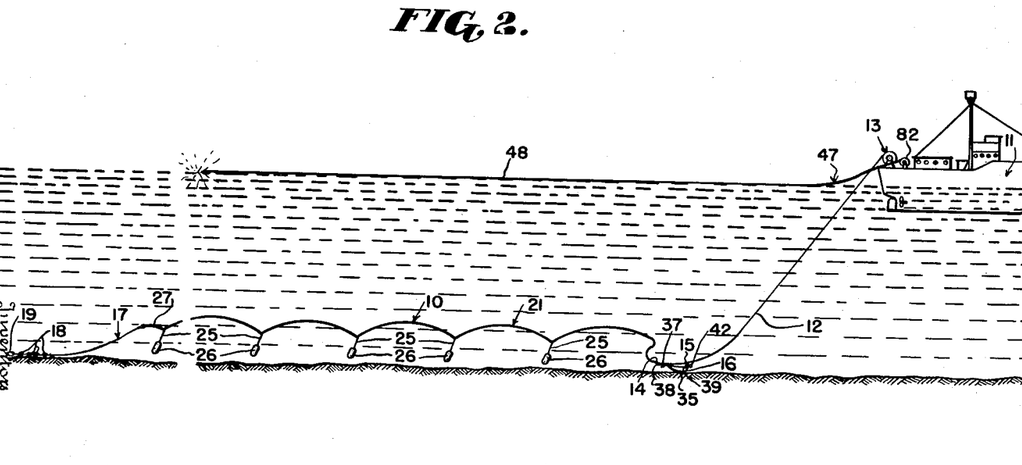
Fig. 2 is a view of a system of Fig. 1 at the instant a shot is fired.

Secured to the streamer at intervals therealong as by the lines 25 are a plurality of cylindrical weights 26 for imparting negative buoyancy to the streamer at the points of connection thereto when the towing force is removed from the streamer, Fig. 2. While the streamer is being towed through the water, the weights 26 assume the position shown in Fig. 1 at a substantial angle from the vertical and the planing action of the weights through the water reduces the gravitational pull of the weights on the streamer sufficiently to cause the streamer to assume the position within the water shown on Fig. 1. To achieve this result, the weights are elongated and pivotally connected to the cable at one end substantially as shown, window weights having been found to be satisfactory for this purpose.

By maintaining the proper degree of buoyancy of the streamer in the manner recited such that the streamer is towed in a straight horizontal line as shown on Fig. 1, spurious microphonic noises which would otherwise be caused by cross action of the water during the towing operation are avoided.

Figure 9:
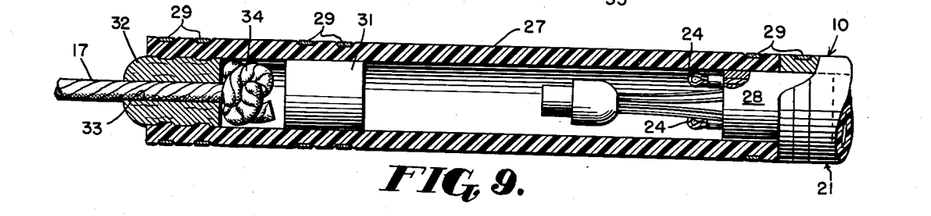
Fig. 9 is a view partly in section and partly broken away of the tail end of the detection streamer and the flexible drag member secured thereto.
Figure 10:
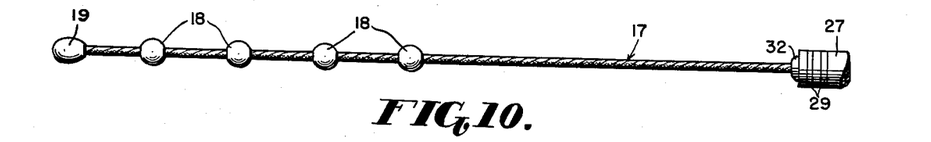
Fig. 10 is a view of the drag member of Fig. 9 connected to the tail end of the detection streamer and showing the weighted masses secured thereto.

The connection between the line 17 and the tail end of the detection streamer 10 will best be understood by referring to Fig. 9 in which a length of hose 27 is connected to the detection streamer 10 at the end portion 28 thereof, by the band or clamp 29 thereby to insure a watertight joint therebetween. There is also provided within the hose 27 a plug 31 composed of any material suitable for the purpose such, for example, as a plastic to which the hose 27 is clamped in water-tight engagement by a pair of bands 29 thereby to prevent water from coming into contact with the end portion of the detection streamer enclosed within the hose 27. A plug 32 composed of material such, for example, as wood is secured within the trailing end of the hose 27 by an additional pair of clamps 29, the plug 32 having a bore 33 within which the line 17 is disposed. The line preferably is knotted as at 34 thereby to secure the line to the detection streamer.

Figures 7, 8:
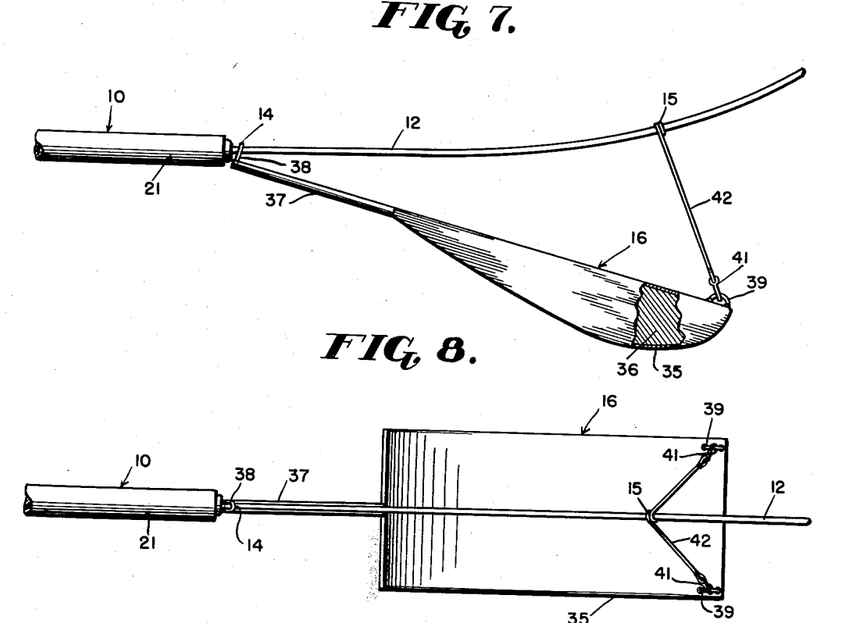
Fig. 7 is a view in elevation and partially broken away of the depressor employed with the system of the present invention connected to the lead-in cable at the head end of the detection streamer.
Fig. 8 is a plan view of the device of Fig. 7.

The depressor 16 of the instant invention will best be understood by consideration of Figs. 7 and 8, the depressor comprising a steel shell 35 of a shape substantially as shown filled with a mass of heavy metal 36 such as lead and provided with a rearwardly extending portion 37 having a loop or eye 38 on the trailing end thereof for connection to the lead-in cable. The forward end of the depressor is provided with a pair of U-shaped members 39 to which is connected as by the snap rings 41 a bridle 42 having the mid-point thereof connected to the lead-in cable 12 as at 15.

Figure 3:
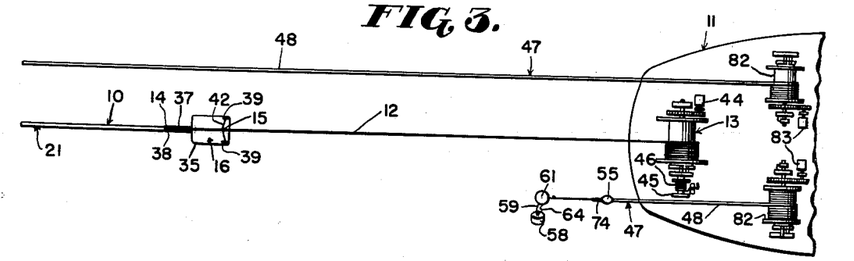
Fig. 3 is an enlarged view of the stern of the towing vessel showing the detector streamer towing mechanism and the apparatus for reeling and towing the pair of firing lines.

The lead-in cable is wrapped about a power reel 13, Fig. 3, having a motor 44 operatively connected thereto and a clutch operable at will for releasing the reel thereby to pay out suddenly a length of tow cable 12 and thus cause the depressor 16 to sink to the bottom and come to rest before the explosive shot is fired. The reel 13 is rotated on the same axis as a reel 45 of lesser diameter upon which is wound a length of cable 46 having one end thereof connected to the end of cable 12 whereby a continuous metallic circuit is maintained between the detecting devices within the detection streamer and the amplifying and recording apparatus on the vessel without employing slip rings, as more fully disclosed in the Palsay Patent 2,465,696.

Figure 6:
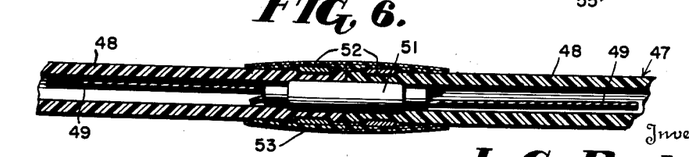
Fig. 6 is a fragmentary view in section of the firing streamer showing the means for connecting together two sections thereof.

The firing line employed with the system of the present invention is indicated generally by the numeral 47 and comprises a tubing 48 of flexible plastic material suitable for the purpose such, for example, as polyethylene having a length of flexible steel stranded wire or cable 49 disposed therein. We have found it desirable to make the firing line in several sections, each of the sections being approximately 150 feet long and to connect the sections together as shown on Fig. 6 in which two lengths of stranded cable 49 are connected as by the cable connector 51. The lengths of tubing 48 are brought into mutual abutting relation and secured in watertight connection to the cable connector as by the locking bands 52. A streamlined sleeve 53 is wrapped or otherwise formed around the locking bands 52 and extends along a length of each of the abutting tubings 48 sufficient to provide a smooth streamlined joint.

By providing a firing line in which the firing cable is anchored thereto at intervals in the aforedescribed manner, an arrangement is provided in which the cable is prevented from creeping within the tubing 48 as the line is quickly reeled in, thereby avoiding kinks in the wire 49 which might eventually result in breakage of the wire. The aforesaid arrangement provides a firing line or cable of positive buoyancy whereby the cable floats on the surface of the water when it has been payed out from the vessel. The end of the firing line is provided with a bayonet type jack 54 preferably composed of stainless steel to which the end of the wire 49 is connected. The jack is bonded or otherwise made watertight with respect to the tubing 48 whereby there is no possibility of water seeping within the firing line structure. It has also been found desirable to provide at the trailing end of the firing line a streamlined float 55 secured thereto in any convenient manner as by cementing the parts together or by employing the clamping devices 56.

Figures 4, 5:
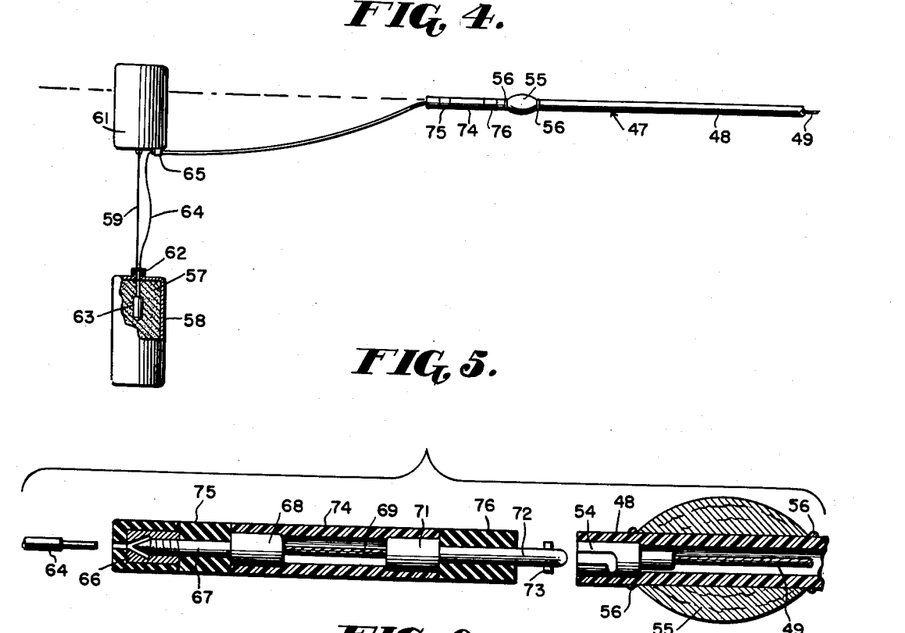
Fig. 4 is an enlarged view of the tail section of the firing streamer and the explosive charge detachably connected thereto.
Fig. 5 is an enlarged view in section of the apparatus employed for detachably connecting the explosive charge to the firing line.

The explosive charge 57 is arranged within a casing 58, Fig. 4, to which is connected as by the line 59 a metallic float 61, a suitable gland 62 preferably being provided on the casing 58 to which the line 59 is secured. The line 59 is employed to establish an electrical firing connection between the float 61 and an electroresponsive detonator 63 within the casing 58 and additionally to support the casing 58 suspended from the float 61 when the float and casing having been launched. The other terminal of the detonator 63 is connected by way of the line or cap wire 64, secured to the casing 61 as at 65, to the line 49 within the firing line 47.

The manner in which this is accomplished will be best understood from a consideration of Fig. 5 in which the line 64 is clamped by a metallic insert 66 into threaded engagement with a complementary member 67 composed of metal such, for example, as stainless steel. The member 67 is provided with a cylindrical portion 68 to which is secured one end of a stranded conductor 69, having the other end thereof connected to the cylindrical portion 71 of a plug 72. The plug 72 is provided with a transverse member 73 for engagement within the bayonet slot at a jack 54. The cylindrical portions 68 and 71 of the member 67 and plug 72 respectively are in watertight engagement with a length of tubing 74 composed of rubber or any of the synthetic varieties thereof such, for example, as a material known in the art as polyethylene. The shank portions of the member 67 and plug 72 are enclosed by sleeves 75 and 76 respectively composed preferably of soft rubber. The insert 66 has preferably molded thereabout a cap composed of Bakelite or the like. An arrangement is thus provided in which the explosive charge and float assembly may be quickly connected to the firing line and in which the end of the firing circuit terminates at the float 61.

Figure 13:
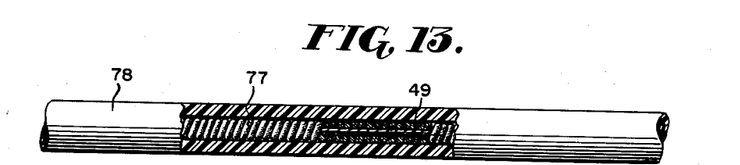
Fig. 13 is a view partially in section of an alternative form of firing line suitable for use with the present invention.

An alternative form of the firing line is disclosed on Fig. 13 in which the firing cable 49 is wrapped by a length of cord 77 or cotton line serving and the plastic or rubber material is extruded thereover to form a flexible sleeve 78. In this arrangement, the firing cable is gripped sufficiently tight by the cord 77 about which the sleeve 78 is snugly formed as to prevent kinking of the cable 49 therein without the necessity of clamping the cable thereto at intervals as in the arrangement of Fig. 6.

Figure 14:
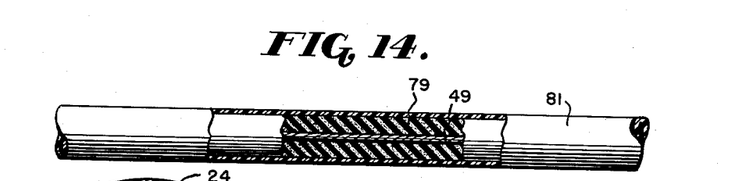
Fig. 14 is a view partially in section of still another form of the firing line.

A still different form of firing cable is disclosed on Fig. 14 in which the cotton serving 77 of Fig. 13 is replaced by sponge rubber of plastic 79 disposed within a service casing 81. Regardless of whether the firing line of Figs. 5, 13 or 14 is employed, it will be understood that the firing line is positively buoyant and floats upon the surface of the water. The firing line is normally wrapped about a reel 82 from which it is payed out at will and quickly retrieved as soon as the explosive shot has been fired by the operation of motor 83 which is employed for operating the reel in a direction to reel in the firing cable. The equipment comprising the reel and firing line, in accordance with the present invention, is provided in duplicate on opposite sides of the vessel near the stern thereof whereby one firing line may be payed out concurrently with the reeling in of the other firing line for a purpose which will be more clearly apparent as the description proceeds.

Figure 12:
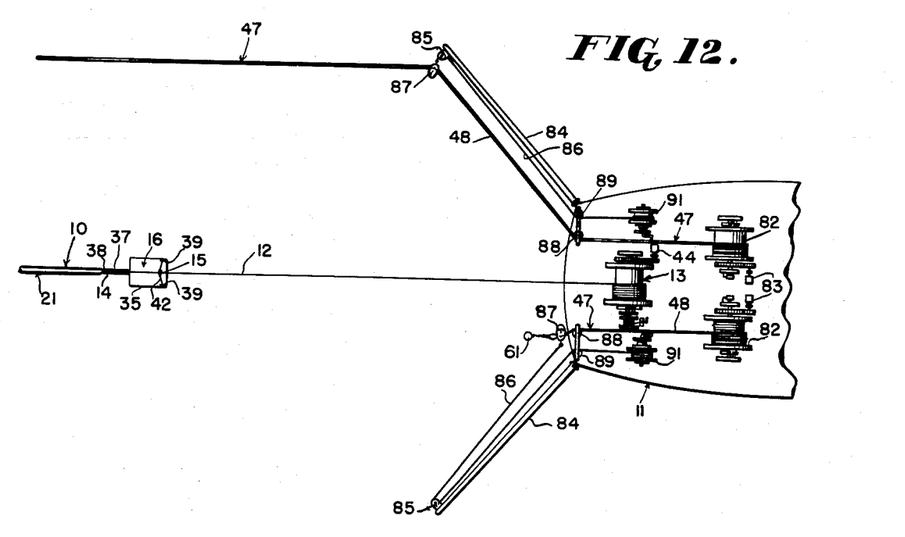
Fig. 12 is an enlarged view of the stern of the towing vessel and the towing arrangement for the detection and explosive streamers in accordance with an alternative form of the invention.

On Fig. 12 is shown an alternative arrangement for paying out the firing lines alternately in successive order which is particularly adapted for use in rough weather or when, for any reason, such as cross winds or cross tides, the vessel is required to head at an angle with respect to its course, the arrangement comprising a pair of booms 84 or outriggers secured to the stern of the vessel for maintaining the firing lines clear of the wake of the vessel and well separated one from the other as the lines are payed out and withdrawn in successive order. Each of the outriggers 84 is provided with a pulley or block 85 at the outer end portion thereof through which a line 86 is passed. The end of the line 86 is connected to a traveling block 87 through which the firing line 47 is passed, the firing line also passing through a fair leader block 88 mounted on the stern of the vessel. The line 86 also passes about a block 89 secured to the stern of the vessel and is wrapped around a reel 91 provided with a friction catch whereby the line 86 may be reeled in and locked with the traveling block 87 substantially against the block 85 as the firing line is payed out. When the firing line is reeled in, the reel 91 is released in any suitable manner, either by means responsive to the additional strain on the block 87 or manually as desired, and the block 87 is moved away from block 85 and brought into substantial abutting relation with block 88 and in position for attachment of a new explosive charge to the firing line.

Figure 16:
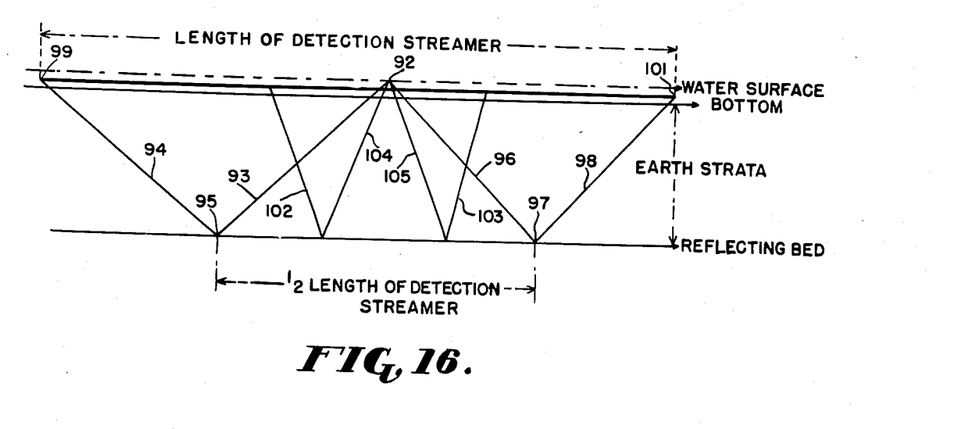
Fig. 16 is a diagram of the shock wave propagated from the explosive charge and in which is shown the ratio of terrain surveyed by a single shot with respect to the length of the detection streamer.

The extent of terrain surveyed by a single explosive shot with respect to the length of the detection streamer will best be understood by consideration of Fig. 16 in which the numeral 92 is employed to designate the origin of the explosion as the detonator 63 is fired. For the purpose of description, it may be assumed that the force of the explosion travels along the line 93 until it reaches the reflecting bed or subsurface layer from which it is reflected as indicated by the line 94, the angle of incidence of the line 93 with the reflecting bed, of course, being equal to the angle of reflection of the line 94 therewith. The point of contact of the explosive wave with the bed is indicated at 95. In a similar manner, the direction of propagation of the explosion along line 96 intersects the reflecting bed at 97 from whence it is reflected along the line 98. It is further assumed that the seismic signal represented by the lines 94 and 98 intersect the microphones at the end portions of the detection streamer at 99 and 101, respectively, the distance between the points 99 and 101 representing the effective length of the detection streamer. The distance between the points 95 and 97 represents the maximum length of the subaqueous terrain from which seismic signals will be reflected to the detection streamer by a single explosive shot. It should now be clearly apparent that the length of terrain surveyed by the shot is equal to one-half the detection streamer length. Intermediate sections of the terrain surveyed cause seismic waves to be transmitted along the lines 102 and 103 in response to pressure impulses received along the lines 104 and 105, respectively.

From the foregoing, it is clearly apparent that for a continuous seismic survey explosive shots are required to be fired at intervals corresponding to one half the length of the detection streamer and for this reason, in the high speed seismic surveying system herein disclosed, two firing lines are provided, each of the lines being withdrawn by the power reel 82 associated therewith as soon as the explosive charge connected thereto is fired. While this is taking place, the other firing line has been lowered to the water from the opposite side of the vessel and drifts back on the surface of the water toward a position opposite the center of the detection streamer as the vessel moves forward and tows the submerged detection streamer to a new firing position.

Figure 15:
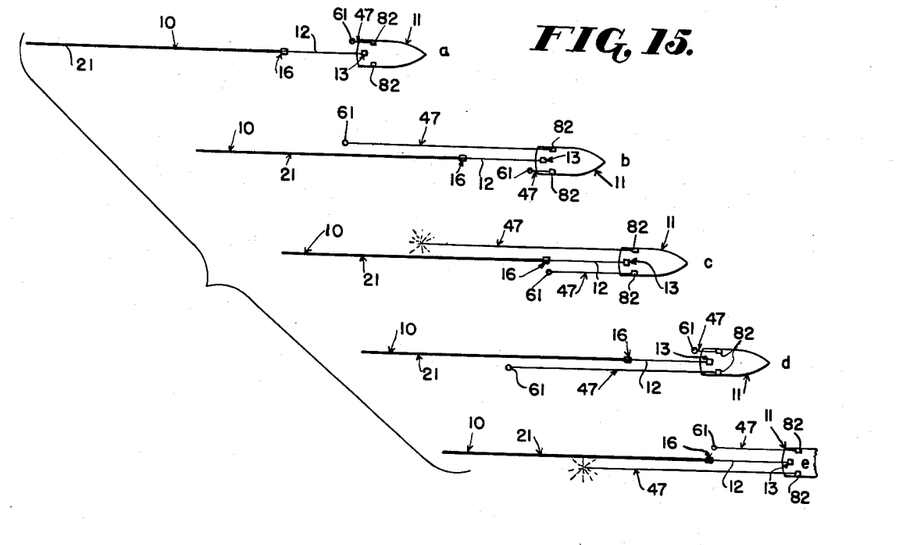
Fig. 15 is a view in diagrammatic form of the detection streamer and firing lines at five different positions of the vessel corresponding respectively to the reference letters $(a)$—$(e)$ during a cycle of operation of the system.

This operation will be best understood by reference to Fig. 15 on which is shown the vessel 11 under way and the detection streamer 10 being towed thereby at a short distance from the bed of the body of water with the depressor 16 in substantially the position illustrated on Fig. 1. The port reel 82 is released and the firing line 47 and float 61 assembly is permitted to drift back while the detection streamer is towed to the position shown at (b). The reel 13 is now released and the depressor 16 quickly sinks and comes to rest on the bed of the body of water. In the meantime the explosive charge and float 61 assembly has been lowered into the water from the starboard side of the vessel, the reel 82 associated therewith has been released and the explosive charge on the starboard firing line has drifted back to a position opposite the depressor 16 as the depressor sinks to the bottom in response to the release of reel 13. The port firing line is supplied with an electrical firing signal when the vessel and detection streamer 10 have moved forward to a position corresponding to (c) such that the explosion occurs directly above the center of the detection streamer. The port firing line is now quickly withdrawn by the reel 82, a new explosive charge and float is affixed thereto and the charge is lowered into the water when the vessel has moved to position (d).

It will be understood that as soon as the seismic signals have been received by the detection streamer in response to the explosion of the port explosive charge, a length of lead-in cable 12 is quickly reeled in by the reel 13 sufficient to raise the depressor 16 from the bottom and restore the detection streamer from the position shown on Fig. 2 to the towing position of Fig. 1. With the float 61 and explosive charge associated with the starboard firing line in the position shown with the vessel at (d), the reel 13 is quickly released and the depressor 16 again sinks to the bottom preparatory to firing the starboard explosive charge opposite the center portion of the detection streamer when the vessel has moved forward to position (e), the port firing line with a new charge affixed thereto being launched and drifting rearwardly as illustrated. During the foregoing cycle of seismic surveying operations, it will be understood that each time the depressor 16 is lowered to the bottom and the detection streamer assumes the position shown on Fig. 2, the buoyancy of the streamer is alternately positive and negative throughout the length thereof, the total or overall buoyancy of the streamer, however, being slightly negative at this time by reason of the weights 26 connected thereto.

In order to employ maximum sensitivity of the microphones within the detection streamer in obtaining clear and unmistakeable recordings of seismic signals of relatively weak strength to the exclusion of other signals which may be interspersed therewith, it has been found highly advantageous to isolate from the detection streamer certain spurious signals set up by the lead-in cable by which the detection streamer is towed and to prevent spurious noises from originating within the detection streamer as the towing force thereto is removed. It is an important aspect of this invention, therefore, to provide at the head end of the detection streamer a depressor substantially as shown which will firmly anchor the leading end of the detection streamer to the bottom while seismic signals are being received whereby noise caused by the lead-in cable as the tension is removed therefrom is prevented from being transmitted along the detection streamer and thus reaching the microphones within the detection streamer. Furthermore, by providing a detection streamer of slightly positive buoyancy and having secured at the tail end thereof a flexible drogue weighted sufficiently to drag along the bottom, the detection streamer thus tends to rise within the water as the depressor comes to rest on the bed of the water. By applying a gravitational force at predetermined selected points along the streamer by means of the plurality of weights affixed thereto, the buoyancy of the streamer is made alternately positive and negative whereby the entire length of streamer is maintained in tension while seismic signals are received and thus spurious signals originating within the detection streamer which would otherwise result from the interruption of the towing force applied thereto are prevented. It will be understood that, whereas in the foregoing description the detection streamer has been described as having a plurality of piezoelectric microphones therein for detecting the seismic signals, other detecting devices such, for example, as seismometers may be employed for this purpose, if desired.

In the operation of the system of the present invention the buoyancy of the detection streamer is adjusted within close limits such that the streamer is slightly positively buoyant. It is highly important that this buoyancy be just sufficient to cause the portions of the streamer to rise slowly between the points of connection with the weights while the towing force is removed from the streamer and to produce a condition of arching of the sections between the weights just sufficient to maintain the streamer in tension. In the event that excessive arching should occur, the transverse component of flow of the water against the streamer produces unwanted spurious signals as a result of turbulence of the water thereagainst during continued forward motion of the streamer through the water. Furthermore by providing a detection streamer in which certain portions thereof slowly rise within the water and concurrently therewith the intermediate portions slowly sink while the forward end thereof is anchored, the spurious signals generated by the microphonic detection devices disposed within the rising portions of the streamer are in opposition to the spurious signals generated by the microphones disposed within the sinking portions of the streamer and thus the spurious signals due to the up and down motion of the streamer are averaged out. By maintaining the buoyancy of the streamer within close positive limits of neutral buoyancy the rate of ascent of the arched portions of the streamer is held to a minimum and the spurious signals which are balanced out are thus held to a minimum value.

The step-by-step operation of the system is another important feature of the invention whereby the explosive charges are quickly attached to the trailing end of the firing lines, the firing lines are payed out from opposite sides of the vessel and float on the surface of the water, and the explosive charges are fired just beneath the surface of the water in alternate succession when each of the explosive charges has reached a point midway the length of the detection streamer. This system also provides for surveying completely a continuous strip of subaqueous terrestrial formation while the vessel is moving at a relatively high rate of speed and in which the signals detected by the detecting devices within the detection streamer comprise only reflected seismic signals to the exclusion of other signals of a fortuitous nature which may result from the operation of the system.

While the invention has been described with particular reference to a preferred embodiment thereof which gives satisfactory results, it will be understood by those skilled in the art to which the invention pertains, after understanding the invention, that various changes, and modifications may be made and various instrumentalities may be employed without departing from the spirit and scope of the invention and it is our intention, therefore, in the appended claims to cover all such changes, modifications and instrumentalities.

What we claim as new and desire to secure by Letters Patent of the United States is:

1. In a waterborne system for seismic prospecting for geological structures disposed beneath a body of water, in combination, a positively buoyant elongated flexible streamer having a plurality of detecting devices disposed at intervals therein, a flexible lead-in cable connected to the head end of said streamer for effecting a towing connection to a continuously moving vessel, means on the vessel for paying out suddenly a predetermined length of said cable while the vessel is moving along a course, a depressor connected to said cable at the head end of the streamer for maintaining the head end of the streamer near the bottom while the streamer is being towed, said depressor having sufficient mass to anchor the head end of the streamer as the length of cable is payed out, a plurality of cylindrical elongated negatively buoyant hydrofoil devices movably suspended by one end thereof at intervals from the streamer for maintaining the streamer in tension while the head end thereof is anchored, each of said hydrofoil devices tilting to a planning position such that the streamer is straight throughout the length thereof while being towed and the hydrofoil devices pivot to a more nearly vertical position while the streamer is anchored whereby the detecting devices disposed within the portions of the streamer adjacent the hydrofoil devices slowly descend while the detecting devices disposed within the intermediate portions of the streamer slowly rise within the water, and a flexible weighted drogue in continuous contact with the bed of the body of water and connected to the tail end of said streamer for stabilizing the streamer and for applying a continuous tension to the trailing end thereof.

2. A system for seismic surveying of subaqueous structures comprising an elongated positively buoyant flexible streamer having a plurality of detecting devices disposed at intervals therein, a tow cable connected to the head end of said streamer for effecting a towing connection to a moving vessel, means on said vessel for suddenly releasing a predetermined additional length of said tow cable while the vessel is moving continuously along a course, a depressor connected to said cable at the head end of the streamer for maintaining the head end of the streamer near the bottom while the streamer is being towed and for anchoring the head end of the streamer as said additional length of cable is payed out, a weighted flexible drogue connected to the tail end of said streamer for applying a drag force thereto, and a plurality of cylindrical negatively buoyant hydrofoil devices movably suspended at one end thereof from the streamer at intervals for maintaining the streamer in tension while the head end thereof is anchored, said hydrofoil devices being tilted to a planing angle sufficient to render the streamer effectively neutrally buoyant while the towing force is applied thereto and having sufficient mass to cause the total net buoyancy of the streamer and weights to be slightly negative while the streamer is anchored.

3. In a seismic detecting system of the character disclosed, in combination, means including a positively buoyant firing line payed out from a moving vessel for firing an explosive shot just beneath the surface of the water in the wake of the vessel, a positively buoyant elongated streamer having a plurality of devices disposed at intervals therein centrally disposed beneath said explosive shot for detecting seismic disturbances initiated thereby, a flexible lead-in cable for establishing a towing connection between the head end of said streamer and the vessel, a weighted depressor connected to said cable at the head end of the streamer for maintaining the streamer near the bottom when a towing force is applied thereto, means on the vessel for suddenly releasing a predetermined additional length of said cable thereby to cause the depressor to sink quickly to the bottom and anchor the head end of the streamer while the remaining length of the streamer continues to move forward by inertia, and a plurality of weights pivotally suspended by one end thereof from the streamer at intervals for retarding the forward movement of the streamer while the head end thereof is anchored and for maintaining the streamer in continuous tension while seismic signals caused by said shot are received by said detecting devices during said forward movement.

4. In a waterborne seismic surveying system of the character disclosed, in combination, a flexible elongated streamer having a plurality of detection devices therein constructed and arranged to be towed near the bed of a body of water by a continuously moving vessel and anchored periodically to said bed, a positively buoyant firing line, means for quickly connecting a float to the trailing end of said line while all the line is on the vessel, an explosive charge suspended by said float near the surface of the water when the float has been launched and adapted to be fired by a firing signal received over said line through said connecting means, and means for paying out a predetermined length of said firing line from said vessel whereby the explosive charge is fired above the mid portion of said streamer while the streamer is moving forwardly and the front end thereof is anchored and seismic signals caused by the explosion of said charge are received by the detecting devices.

5. In a waterborne seismic surveying system of the character disclosed, an elongated positively buoyant flexible firing line adapted to be payed out from a moving vessel and retrieved at will, an explosive charge having detonating means therein and a float connected thereto whereby the charge is adapted to be suspended by the float near the surface of the water, a flexible connection secured to said float and having means therein for establishing an external electrical connection from the firing line to said detonating means, and means for quickly connecting said float and electrical connecting means to the trailing end of the firing line.

6. In a seismic prospecting system for subaqueous geological structures, in combination, a firing conductor connected to a vessel, an elongated flexible tubular member composed of insulating material within which the firing conductor is disposed and anchored thereto at intervals, said tubular member being of sufficient size to float on the surface of the body of water, a bayonet joint secured to the trailing end of the member in watertight relation therewith to which the end of the conductor is connected, a float having explosive means secured thereto in proximate space relation whereby the charge is adapted to be suspended by the float just beneath the surface of the water, means including a flexible member having one end thereof connected to said explosive means for establishing an electrical connection thereto, complementary means on the other end of said flexible member for quick connection to said bayonet joint thereby to connect the float to said tubular member and establish a firing connection from said conductor to said explosive means, and a flexible streamer disposed near the bottom of said body of water and connected to the vessel for detecting seismic signals caused by the explosion of said explosive means.

7. In a system of the character disclosed for seismic prospecting for subaqueous structures, in combination, an elongated flexible streamer having a plurality of detecting devices therein, a flexible lead-in cable connected to the head end of said streamer for effecting a towing connection to a continuously moving vessel, means including a depressor secured to said cable for towing the streamer near the bottom and anchoring the head end of the streamer thereto momentarily when the streamer has been towed a distance corresponding to one-half the length thereof and the towing force is suddenly removed, means on said vessel for raising said depressor from the bottom and reapplying said towing force to the streamer while the streamer is continuously moving forward, a pair of positively buoyant firing lines of predetermined length adapted to be payed out in alternate succession from opposite sides of the vessel while the vessel is under way, each of said firing lines having an explosive charge connected thereto and disposed just beneath the surface of the water whereby the charges are fired alternately in succession above and opposite the center portion of the detection streamer while the streamer is anchored to actuate all of said detecting devices as each charge is fired and thereby obtain a continuous survey of the structures beneath the course on which the vessel and streamer are continuously traveling.

8. In a system of the character disclosed for seismic prospecting for subaqueous structures, in combination, an elongated flexible streamer having a plurality of detecting devices therein, a flexible lead-in cable connected to the head end of said streamer for effecting a towing connection to a continuously moving vessel, means including a depressor secured to said cable for towing the streamer near the bottom and anchoring the head end of the streamer thereto when the streamer has been towed a distance corresponding to one-half the length thereof and the towing force is momentarily removed, a pair of positively buoyant firing lines, each of said firing lines having an explosive charge connected thereto and to a float prior to launching thereof whereby each explosive charge is disposed just beneath the surface of the water, means including a pair of booms extending outwardly from opposite sides of the vessel for paying out the firing lines in alternate succession and quickly retrieving the lines when the explosive charges connected thereto have been fired thereby to maintain a degree of separation between the lines in the water in excess of the beam of the vessel, said explosive charges being fired in alternate succession opposite the center portion of the detection streamer while the streamer is moving forward and the head end thereof is anchored thereby to actuate all of said detecting devices as each charge is fired.

9. A system of the character disclosed for firing an explosive charge within a body of water from a vessel comprising, in combination, a positively buoyant retrievable firing cable having a plurality of interconnected sections and adapted to be payed out from the vessel while in motion, a plurality of electrical conductors respectively anchored to each of said sections at intervals, means for interconnecting said conductors, an explosive charge connected to said cable, and detachable means for establishing an electrical connection between said conductors and said charge whereby the charge is fired in response to a firing signal applied to said conductors.

References Cited in the file of this patent

UNITED STATES PATENTS

| Number | Name | Date |
|---|---|---|
| 2,203,894 | Cooke | June 11, 1940 |
| 2,219,508 | Athy et al. | Oct. 29, 1940 |
| 2,241,428 | Silverman | May 13, 1941 |
| 2,283,200 | Flude | May 19, 1942 |
| 2,324,378 | Flude | July 13, 1943 |
| 2,351,524 | Lay | June 13, 1944 |
| 2,440,903 | Massa | May 4, 1948 |
| 2,465,696 | Paslay | Mar. 29, 1949 |
| 2,599,245 | Finn | June 3, 1952 |
| 2,614,165 | Doolittle | Oct. 14, 1952 |
| 2,622,691 | Ording | Dec. 23, 1952 |
| 2,627,930 | Woods | Feb. 10, 1953 |
| 2,652,550 | Lash | Sept. 15, 1953 |